INVENTORS E.M. GUNTER
J. L. SIMON
BY Howard R. Popper
ATTORNEY

United States Patent Office 3,435,152

Patented Mar. 25, 1969

3,435,152

RINGING SIGNAL DETECTOR WHICH DISTINGUISHES RINGING SIGNAL FROM PERIODIC NOISE

Ernest M. Gunter, Lanham, Md., and James L. Simon, Middletown, N.J., assignors to Bell Telephone Laboratories, Incorporated, Murray Hill, N.J., a corporation of New York Filed May 13, 1966, Ser. No. 549,886

Int. Cl. H04m *3/00*

U.S. Cl. 179—84 7 Claims

ABSTRACT OF THE DISCLOSURE

Interrogates central office line at 60 p.p.s. using a magnetic structure. Output is coupled to detector circuit. When ringing signal is present, detector circuit senses polarity reversal in subsequent output pulses and activates lamp at telephone.

Figure 1:
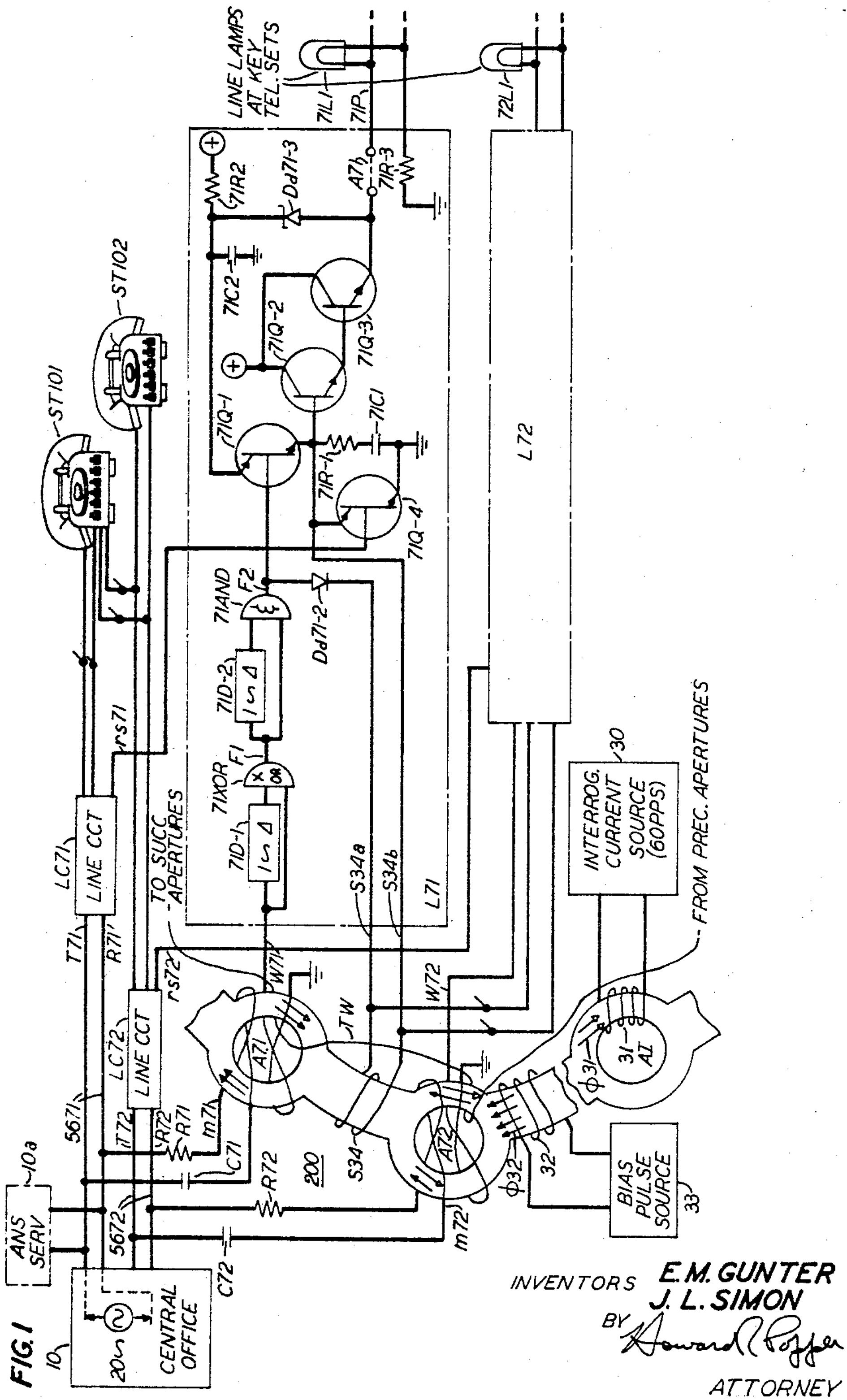

This invention relates to telephone circuits and more particularly to the detection of ringing signals applied to the lines of key telephone systems and the like.

The bell at a telephone set is conventionally sounded by 90-volt, 20-cycle current applied by the central office to the line for one second of every four. In multiline telephone customer installations, particularly key telephone systems, ringing signal detection has been accomplished by providing an A.C. relay and thermistor or gas tube circuit per line. Since the A.C. relay and thermistor required a considerable amount of energy for its operation, it was not troubled by 60-cycle inductive pick-up or by other, normally low-energy, line noise. Additionally, the A.C. relay connected across the line was inherently balanced-to-ground and therefore immune to longitudinal noise. However, the need to have one A.C. relay per line prevented multiline key system equipment from being miniaturized, particularly because ringing detecting relays are fairly large and bulky circuit components.

As a replacement for the A.C. ringing detecting relays, it was proposed to substitute sensitive transistor circuitry which, of course, can be fabricated to occupy very little space. However, it was found that because of the inherent sensitivity of transistor circuits and the fact that they were not balanced with respect to ground, they were vulnerable to the stray 60-cycle inductive pick-up which is nearly always present on telephone lines. Decreasing the effective sensitivity of the transistor ringing detector circuits by requiring them to reject any A.C. signal below, say, 30 volts, was only a partially satisfactory expedient because the ringing signal itself, due to line resistance, in some cases would be attenuated to the neighborhood of 50 volts. The transistor circuit was then faced with the problem of discriminating between attenuated 20-cycle ringing and 60-cycle noise pick-up. Under certain circumstances, the nominal two-to-one amplitude threshold was not sufficient to prevent the transistor circuit from falsely triggering ringing in the key telephone system. Transformer coupling the transistor circuit to the telephone did not provide a satisfactory solution because the size of a transformer for 20 cycles was at least as large as the A.C. relay to be replaced.

Accordingly, it is an object of the present invention to provide a detector for the presence of ringing signals which will not be falsely activated by line noise, and particularly by A.C. line noise.

It is another object of the present invention to provide a compact ringing signal detecting apparatus for detecting the appearance of a ringing signal on any of a plurality of lines associated with a key telephone system.

It is another object of the invention to distinguish alternating current ringing signals from periodic noise having a different frequency than that of the ringing signal.

In accordance with a particular aspect of the invention, it is always possible to detect 20-cycle ringing on a telephone line subject to 60-cycle noise so long as the amplitude of the ringing is at least twice that of the noise.

Generally, in accordance with the principles of the present invention, the appearance of ringing on a line subject to periodic noise is detected by sampling the line at the noise frequency so that the noise will be observed to have the same amplitude and polarity each time the line is sampled. When the ringing signal having the different frequency, and greater amplitude than the noise, appears on the line, the resultant instantaneous A.C. component of line voltage will, at least once during every predetermined number of line samplings, have a polarity which will be opposite to that which would be observed when only the periodic noise is present. For example, it has been found that the presence of 20-cycle ringing on a line subject to 60-cycle noise pick-up can be detected by observing the change in polarity of the resultant A.C. component of line voltage which occurs once every three samples of the 60-cycle sampling rate. As a further guard to insure against erroneous response to line noise, the polarity reversals are counted and not permitted to trigger ringing until a predetermined number of such reversals have accrued within a set time. Advantageously, the line may be sampled at a multiple of the noise frequency, in which case the noise amplitudes and polarities will be observed to have a characteristic pattern.

In accordance with the operation of one illustrative embodiment of the present invention, a magnetic structure having an aperture coupled to each line is interrogated at the noise frequency (60-cycle) rate. The line is coupled to its respective aperture in such a manner that the presence o fthe alternating current noise component will unbalance the interrogation flux at the interrogation rate to produce an output from the aperture having a particular polarity (or polarity sequence, since bipolar pulses are produced). The aperture output is coupled to a sequence detector circuit which compares the polarity of each half-cycle portion of output resulting from one interrogation with the respective half-cycle portion of the output resulting from the next interrogation. These polarities agree so long as only 60-cycle pick-up is present on the line. When 20-cycle ringing current is applied to the line, the sequence detector will, at least once every three cycles of the 60-cycle wave, detect a disagreement in polarity between the half-cycle portions. The output of the sequence detector is counted and when a sufficient number thereof are counted within a predetermined time, the local lamp signal generator is "triggered" to indicate ringing. Advantageously, a cascaded or two-stage sequence detector is employed for the purpose of preventing dial pulses (produced, for example, by a telephone answering service bridged across the line) from inadvertently being detected as 20-cycle ringing. The second stage of the sequence detector develops an output to the counter only when the output of the first stage indicates that two successive changes in polarity sequence have occurred. Thus, while the output of the first stage may indicate a single polarity reversal, due to the occurrence of dial pulsing on the line, the percent break characteristics of dial pulsing are such that only one change of polarity sequence will be occasioned thereby.

Accordingly, it is a feature of the present invention to identify the appearance of a ringing signal on a telephone line by sampling the line at the frequency of the line noise.

It is another feature of the present invention that the sampling of the telephone line be conducted to determine the instantaneous alternating current line polarity.

It is a further feature to compare the sequence of line polarity occurring on successive samples and to generate a countable output only when the sequence indicates a reversal of sampled polarity.

It is another feature of the present invention that the foregoing countable outputs again be compared in sequence and a further countable output be provided only when two of the first countable outputs occur on successive sampling intervals.

It is a further feature of the present invention to apply the telephone line current to a multi-aperture magnetic core device which is interrogated at the noise frequency rate so that the interrogation flux is unbalanced by the line current when ringing is present.

The foregoing and other objects and features of the invention may become more apparent by referring now to the following detailed description and drawing, in which:

FIG. 1 shows a ringing signal detection circuit in accordance with the present invention; and FIGS. 2A through 2F show waveforms occurring at the indicated points of the circuit of FIG. 1.

Referring now to FIG. 1, there is shown a central office 10 and lines 5671 and 5672 stretching between central office 10 and line circuits LC71, LC72 of an illustrative key telephone system. The line circuits LC71, LC72, in the conventional manner, are afforded appearances at the key buttons of the various telephone stations ST101, ST102, etc., of the key telephone installation. Thus, line 5672 is, via line circuit LC72, given an appearance at one of the key buttons of each of stations ST101 and ST102. On the other hand, line 5671 is connected by means of line circuit LC71 to station ST101 and to other stations (not shown of this customer installation, but not to station ST102.

When central office 10 has been seized for use by a calling line (not shown) in order to complete a call to any one of the telephone stations associated with line 5671, it will, in the usual manner, apply 20-cycle ringing generator across the tip and ring conductors T71, R71 of the line. Heretofore the line circuit LC71 would have been provided with an alternating current relay which would respond to the 20-cycle A.C. ringing current and initiate appropriate lamp signals indicative of ringing, and, in some cases, trigger local ringing by means of a local ringing supply at the customer's premises. Although not part of the present invention, an answering service 10*a* is shown in dotted form bridged across the tip and ring conductors T71, R71 between the central office 10 and the line circuit LC71. Such an answering service may, in the course of its well-known manner of operation, generate dial pulses on line 5671 which are applied on the "line" side of line circuit LC71 rather than on the "drop" side of the circiut as would be true of dial pulsing originated by telephone ST101. It is an advantage of the ringing signal detection apparatus hereinafter described that provided the dial pulsing has unequal make and break intervals, it will be disregarded even though it might be generated at the same nominal frequency as that of the central office ringing current.

In order to avoid the bulk of an A.C. ringing relay per line circuit so that the equipment for customer installations having a number of lines can be miniaturized, a multi-aperture, "flux-steering" magnetic core device 200 is provided. The multi-aperture device 200 is of ring shape and has one aperture A71, A72, etc., for each line to be monitored for ringing. Multi-aperture device 200 is advantageously fabricated of material having so-called rectangular loop hysteresis characteristics and, in the illustrative embodiment, each of the apertures thereof may have an internal diameter of .040 inch, an outer diameter of .020 inch, with the web between apertures having a width of .040 inch. The inter-aperture web is thus made twice the width of the aperture leg.

In addition to the apertures for coupling to the lines, the multi-aperture device 200 includes at least one interrogate aperture AI coupled to a source of interrogation pulse current 30 whose pulse frequency is the same as that of the noise component expected to be present on each of the lines. Between the interrogation aperture AI and the first of the line monitoring apertures A72 is a bias winding 32 connected to bias current pulse source 33. The energized bias winding 32 provides, in the absence of any other input, a uniform clockwise magnetizing flux $\varphi$32 throughout multi-aperture device 200. Interrogation current pulses are applied to winding 31 to reverse half the bias flux produced by the energization of winding 32. Advantageously, the current through and the number of turns of winding 31 are selected so that the entire flux in the coupled leg of aperture AI is switched. This flux $\varphi$31 is one-half of the flux established by bias winding 32.

In the absence of any inputs to any of the line monitoring apertures A71, A72, etc., the interrogation flux divides equally around each aperture. Each line monitoring aperture is provided with an output winding *w*71, *w*72, etc., to link both halves of the interrogation flux which divides about the apertures. Since the interrogation flux links the halves of each output winding *w*71, *w*72 in opposite direction, the effects of the interrogation flux are canceled and no net voltage appears on any of the output windings. This equal division of flux switching among the legs of an aperture having no other inputs applied is shown by the arrows drawn in the left and right-hand legs of aperture A72. The left-hand leg carries two units of flux, one unit represented by the black arrow due to winding 32, and the other unit represented by the white arrow due to winding 31. Similar fluxes are present in the right-hand leg of aperature A72 and, accordingly, no net flux is switched "around" the aperture. In actual practice, however, it has been found to be desirable to provide a small unbalance in the division of interrogation flux, and for this purpose winding TW which links one leg of each of the apertures (except aperture AI) is provided and energized with a small current.

Let it now be assumed that input winding *m*71, which is A.C. coupled to line 5671 by capacitor C71, is energized by the noise currents which have been induced on the line. Advantageously, input winding *m*71 may be in the "Figure-8" form. Let it be assumed that at the instant that the interrogation flux is applied to aperture A71 the sense of current in winding *m*71 is such as to oppose $\varphi$31 in the left-hand leg and to aid $\varphi$31 in the right-hand leg of the aperture. Under these circumstances, all of the interrogation flux switching is "steered" to occur in the right-hand leg of the aperture. This flux switching will be sensed by output winding *w*71.

Figure 2A:
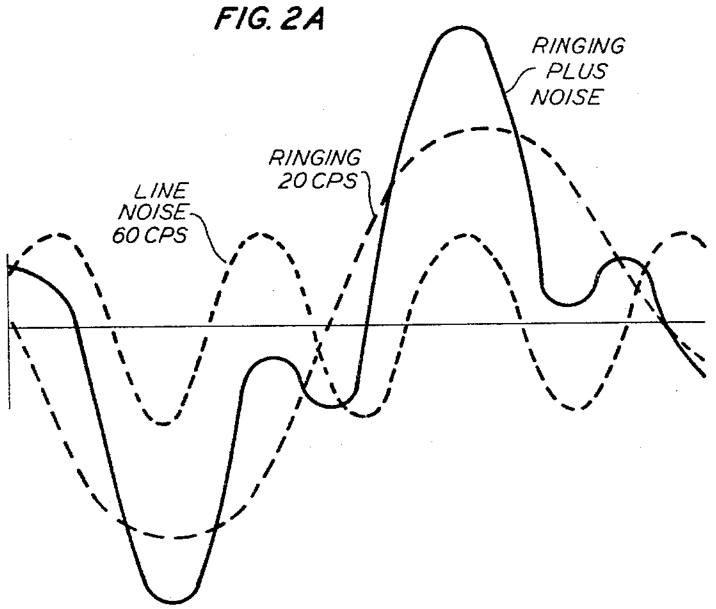
Figure 2B:
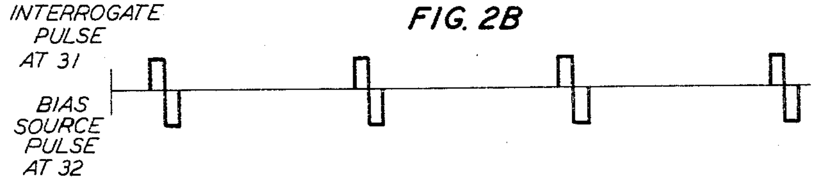
Figure 2C:
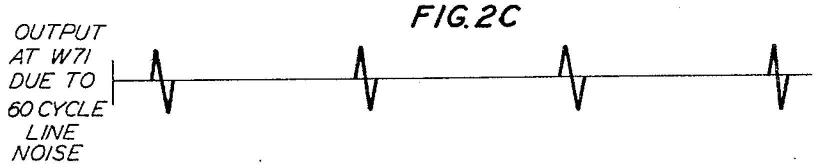
Figure 2D:
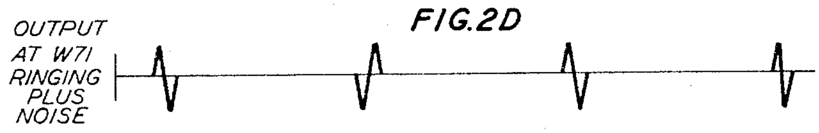

Referring now to FIGS. 2A through 2C, the waveforms corresponding to the line noise current, the interrogate pulse current in winding 31, the bias pulse current in winding 32, and the output voltage waveform resulting therefrom are shown for the case where the interrogate pulses are applied once each cycle in phase with the occurence of a peak of the 60-cycle line noise frequency. It is to be appreciated, however, that it is not necessary that this particular phase correspondence be obtained in practice. Also shown in FIG. 2A, in arbitrary phase relationship to the periodic line noise, is the 20-cycle ringing current waveform and the waveform of ringing-plus-noise.

So long as the line current applied to winding *m*71 is of the same frequency as that of the interrogation pulses applied to winding 31, the interrogation flux will always be steered to occur in the same leg of aperture A71. Thus, the same polarity pulse will always be induced in output winding *w*71 when device 200 is interrogated. Of course, when, as shown in FIG. 2B, the bias pulse, which occurs immediately after the interrogation pulse, is applied the flux will again be switched in the same leg inducing an opposite polarity pulse in winding *w*71. However, the sequence or "phase" of output pulses induced in winding *w*71 will be the same so long as only the periodic noise currents are present in the line and applied to winding *m*71.

When ringing-plus-noise is present on line 5671, the resultant current waveform applied to winding *m*71 is shown in one of the waveforms of FIG. 2A. It will be seen that during the occurrence of the first interrogation pulse of FIG. 2B, the resultant waveform of FIG. 2A is above the horizontal axis. During the second interrogation pulse, the resultant waveform of FIG. 2A is below the axis. The net instantaneous A.C. current in winding *m*71 during the occurrence of the second interrogation pulse is thus of opposite polarity to that during the first interrogation pulse. Accordingly, the flux switching wihch occurs during the second interrogation pulse will be "steered" to occur in the opposite leg of aperture A71. Under these circumstances, an opposite polarity pulse will be induced in winding *w*71, as shown in the second waveform of FIG. 2D. In general, when ringing-plus-noise are present, such an opposite polarity pulse will be produced at least once for every three interrogation pulses.

Figure 2E:
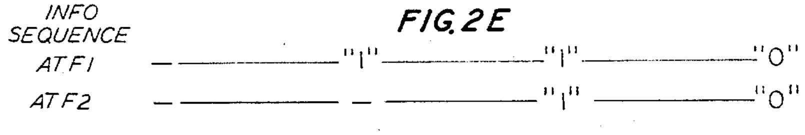
Figure 2F:
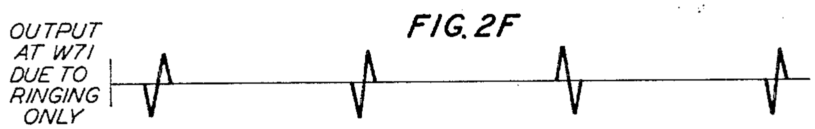

In FIG. 2F, the waveform representing the output which would be induced in winding *w*71 if only pure ringing were present on line 5671 is shown. During the occurrence of the first, second, and fourth interrogation pulses, the instantaneous line current is negative while during the third it is positive. Thus, even when pure ringing is present a reversal in the polarity sequence of output pulses is seen to occur at least once for every three interrogation pulses.

Winding *w*71 is coupled to the input of one-cycle delay device 71D-1 and to one input of Exclusive-Or gate 71XOR. The other input to gate 71XOR is the output of delay device 71D-1. The one-cycle delay time of delay device 71D-1 is one cycle period of the interrogate current source 30 which, as indicated above, is the same as the period of the noise to which the lines 5671, etc., are subjected. Accordingly, Exclusive-Or gate 71XOR compares the polarity of outputs provided by winding *w*71 on successive interrogation cycles. When only the noise pick-up is present on the line, the output appearing on winding *w*71 will be due solely to the noise component; and, Exclusive-Or gate 71XOR will receive like input signals at each of its inputs. In accordance with the well known operation of Exclusive-Or gates, the output thereof, when both of its inputs are alike, should be "0". If electronic devices are employed in gate 71XOR the "0" output may, in fact, be represented by the absence of any signal at point F1. On the other hand, if magnetic logic, particularly, "flux-steering" magnetic logic components are employed, the "0" output at point F1 will be represented by one phase or sequence of bipolar pulses while a "1" output (obtained when the inputs to gate 71XOR disagree) will be represented by a different phase or sequence of bipolar pulses.

If magnetic devices are employed and are to be followed by transistors, such as 71Q–1 of the counter, it is necessary to define which of the bipolar outputs is the "0" output. Winding *s*34 and diode D*d*71–2 are provided for this purpose. To understand the operation, let it be assumed that delay device 71D–2 and AND gate 71AND are replaced by a short circuit so that diode D*d*71–2 is assumed to be connected to point F1 at the output of Exclusive-Or gate 71XOR. Winding *s*34 is coupled to an aperture web of multi-aperture device 200 so as to sense the interrogation flux switching produced by the periodic energization of winding 31 and the reversal of this flux by the energization of bias winding 32. Accordingly, winding *s*34 will produce a bipolar signal which will make lead *s*34*a* positive with respect to the lead *s*34*b* during one half-cycle, and negative with respect thereto during the next ensuing half-cycle. Diode D*d*71–2 will conduct when a positive half-cycle output is obtained from Exclusive-Or gate 71XOR provided that lead *s*34*a* is negative with respect to lead *s*34*b*. A positive output from Exclusive-Or gate 71XOR would (assuming delay device 71D–2 and gate 71AND to be shorted out as assumed above) tend to turn on PNPN transistor 71Q–1. Since it is not desired to count any portion of the bipolar pulses appearing on winding *w*71 due to noise, diode D*d*71–2 is connected to the end of winding *s*34, i.e., to lead *s*34*a* which will be negative-going at the same time that the output of gate 71XOR is positive-going. Of course, during the negative half-cycle output of gate 71XOR, lead *s*34*a* will correspondingly be positive and back bias diode D*d*71–2. However, the negative output from gate 71XOR is ineffective to turn on PNPN transistor 71Q–1 and so the negative half-cycle portion is nto counted either.

The input to AND gate 71AND comprises the output of gate 71XOR and the output of delay device 71D–2. Accordingly, AND gate 71AND provides an output at F2 only when gate 71XOR produces identical positive signals on successive interrogations of aperture A71. The information content of the output at F2 (when ringing-plus-noise is applied to winding *m*71) is represented in the lower line of FIG. 2E. The upper line of FIG. 2E represents the information content of the pulse sequence at F1. Thus, while at F1 the reversals in pulse sequence polarity which occur during the occurrence of the second and third interrogation pulses are detected as two reversals in pulse sequence polarity, the additional comparator stage, 71D–2, 71AND, further refines the output so that a single positive output may be delivered to transistor 71Q–1.

When the positive pulse is delivered to transistor 71Q–1, the charge which priorly accumulated on capacitor 71C2 is transferred through the transistor and resistor 71R–1 to capacitor 71C1. This charge was limited by the breakdown potential of Zener diode D*d*71–3. Transistor 71Q–1 turns off as soon as this charge has been so transferred. The charge on capacitor 71C1 then turns on transistors 71Q–2 and 71Q3 in sequence. A current path is provided at the emitter of transistor 71Q–3 and lead 71*p* through the parallel connected line lamps 71L1 at each of the key telephone stations ST101, etc., having a pick-up key for line 5671 and resistor 71R–3 to ground. The current flowing through resistor 71R–3 and the aforementioned line lamps, though at this point not yet sufficient to illuminate the lamps, raises the potential to which charge limiting diode D*d*71–3 is returned and accordingly the potential of capacitor 71C2 is correspondingly raised. The next time that transistor 71Q–1 is turned on, this increased charge will be delivered to capacitor 71C1 and it, in turn, will cause an increased current to be delivered from the emitter of transistor 71Q–3 raising again the potential to which charge limiting Zener diode D*d*71–3 is returned. When a sufficiently increased current has been provided, line lamp 71L1 as well as the other line lamps will be illuminated. However, a sufficient number of such incremental charges must be delivered to capacitor 71C1 within the time determined by the time constant of this capacitor's discharge path. Advantageously, this time constant may be adjusted to require 8 "turn-ons" of transistor 71Q–1 within one-half second, thus corresponding to the detection of central office ringing within 24 pulses of the 60 p.p.s. interrogation source 30. This "counting" of the number of positive polarity inputs provided at F2 before the line lamps are permitted to be illuminated constitutes a further advantageous degree of protection which insures that a random line polarity reversal will not trigger ringing. Although not shown in the drawing, a current level detector circuit including a flux-steering magnetic core device, similar to device 200, or additional stages of current amplification may be included in lead 71*p* at A71. However, for the purpose of simplifying the drawing, this additional stage as well as circuitry for providing lamp illumination at distinctive wink and flash rates has been omitted from the drawing.

Such circuits, however, may be provided by those skilled in the art.

When the station such as ST101 answer the call, line circuit LC71 in the usual manner detects the completion of a D.C. bridge across the tip and ring conductors. Lead *rs*71 is grounded by the line circuit and turns on transistor 71Q–4. Transistor 71Q–4 provides a short-circuit discharge path for capacitor 71C1, turning off transistors 71Q–2 and 71Q–3.

It is to be understood that the above-described arrangements are illustrative of the application of the principles of the invention; numerous other arrangements may be devised by those skilled in the art without departing from the spirit and scope of the invention.

What is claimed is:

1. A circuit for detecting the appearance of signals having a first periodic recurrence rate on a line subjected to periodic noise of a second recurrence rate comprising means for periodically sensing the instantaneous polarity of said line at said second recurrence rate, means for comparing the instantaneous line polarity obtained on successive ones of said sensings, and means coupled to said comparing means for counting the number of opposite polarity line samples occurring within a predetermined time.

2. A circuit according to claim 1 wherein said means for sensing comprises a magnetic member or remanent flux path material having a pair of equal cross-section legs, means for normally switching a portion of the remanent flux of both of said legs, and means coupled to said line for steering said switching flux among said legs in accordance with the instantaneous polarity of current in said line.

3. A circuit according to claim 2 wherein said comparing means includes a delay device and gate means coupled to said legs, said delay device having a delay equal to the period of one cycle of said second recurrence rate.

4. A circuit according to claim 3 wherein said comparing means includes an Exclusive-Or gate having one of its inputs connected to the output of said delay device.

5. A circuit according to claim 4 wherein said comparing means includes a second delay device and an AND gate connected to the output of said Exclusive-Or gate.

6. A circuit for detecting the appearance of signals having a first periodic recurrence rate on a line subjected to a periodic noise of a second recurrence rate comprising means for producing at said second recurrence rate a first sequence of pulses when said line has one instantaneous polarity and an opposite sequence of pulses when said line has an opposite instantaneous polarity, means for detecting the change from said first to said opposite sequence of pulses, and means for counting said changes detected within a predetermined interval.

7. A circuit for detecting ringing signals applied to a telephone line in the presence of noise signals, said noise signals occurring at a higher frequency than said ringing signals, said circuit comprising means for interrogating said line at said noise signal frequency and means responsive to said interrogating means for detecting polarity changes on said line within a period of said ringing signal frequency.

References Cited

UNITED STATES PATENTS 3,192,323 6/1965 Hersey.

WILLIAM C. COOPER, *Primary Examiner.*

W. A. HELVESTINE, *Assistant Examiner.*